US005607524A

United States Patent [19]
Klemp et al.

[11] Patent Number: 5,607,524
[45] Date of Patent: *Mar. 4, 1997

[54] DRIVE SHAFTS FOR VEHICLES AND OTHER APPLICATIONS AND METHOD FOR PRODUCTION

[75] Inventors: Thomas J. Klemp, Massena, N.Y.; John A. Dickson, Jr., Wayne, Pa.; Darwin O. Collins, Lafayette, Ind.

[73] Assignee: Aluminum Company of America, Pittsburgh, Pa.

[*] Notice: The portion of the term of this patent subsequent to Mar. 18, 2013, has been disclaimed.

[21] Appl. No.: 293,534

[22] Filed: Aug. 19, 1994

Related U.S. Application Data

[63] Continuation-in-part of Ser. No. 190,414, Feb. 2, 1994.

[51] Int. Cl.$^6$ .................................................. C22F 1/05
[52] U.S. Cl. ........................... 148/521; 148/689; 148/690; 148/695; 72/283
[58] Field of Search ..................... 148/521, 689, 148/690, 695, 417, 439; 72/276, 283, 284; 464/182, 183

[56] References Cited

U.S. PATENT DOCUMENTS

| | | | |
|---|---|---|---|
| 2,614,053 | 10/1952 | Bobb et al. | 148/690 |
| 3,133,796 | 5/1964 | Craig, Jr. | 428/654 |
| 3,306,787 | 2/1967 | Dies | 148/439 |
| 3,418,177 | 12/1968 | Pryor | 148/689 |
| 3,563,815 | 2/1971 | Meier et al. | 148/692 |
| 3,594,133 | 7/1971 | Cote et al. | 428/687 |
| 3,645,804 | 2/1972 | Ponchel | 148/502 |
| 3,762,962 | 10/1973 | Nilsson | 148/689 |
| 3,879,194 | 4/1975 | Morris et al. | 420/535 |
| 3,935,007 | 1/1976 | Baba et al. | 420/535 |
| 3,945,861 | 3/1976 | Anderson et al. | 148/690 |
| 4,000,007 | 12/1976 | Develay et al. | 148/523 |
| 4,042,424 | 8/1977 | Nicoud | 148/690 |
| 4,082,578 | 4/1978 | Evancho et al. | 148/535 |
| 4,113,472 | 9/1978 | Fister, Jr. et al. | 420/535 |
| 4,256,488 | 3/1981 | Livak | 420/534 |
| 4,527,978 | 7/1985 | Zackrisson | 464/183 |
| 4,589,932 | 5/1986 | Park | 148/690 |
| 5,342,459 | 8/1994 | Klemp et al. | 148/690 |

OTHER PUBLICATIONS

"A New Alloy for Use in Body Parts for Motor Vehicles", by M. Buratti et al, *Alluminio,* vol. 47, No. 10, pp. 372–374, Oct. 1978.

*Primary Examiner*—George Wyszomierski
*Attorney, Agent, or Firm*—Carl R. Lippert; Glenn E. Klepac

[57] ABSTRACT

Methods for making an aluminum drive shaft for automobiles or trucks or other drive shaft applications from aluminum alloy tube and methods for making said tube including using an aluminum alloy containing about 0.5 to 1.3% magnesium, about 0.4 to 1.2% silicon, and about 0.6 to 1.2% copper and preferred practices for making the tube. The preferred practices include extrusion temperature and other aspects of extrusion, along with cold drawing. One preferred practice includes reducing tube diameter and increasing wall thickness at one or both ends of the drive shaft tube shortly after solution heating and quenching and applies to various 6000 Series type aluminum alloys.

35 Claims, No Drawings

DRIVE SHAFTS FOR VEHICLES AND OTHER APPLICATIONS AND METHOD FOR PRODUCTION

This application is a continuation-in-part of U.S. Pat. application Ser. No. 190,414, filed Feb. 2, 1994.

The invention relates to improved automotive truck and other vehicular drive shafts for transmitting torque from one point, such as a transmission, to another, such as a front or rear axle assembly, and more particularly to improved aluminum tubular members used in making such drive shafts and to a method for producing such.

BACKGROUND

Drive shafts are commonly used in rear drive and four-wheel drive automobile and truck power trains and other vehicle drive trains to conduct torque and power from an engine or transmission located at one point in the vehicle to another site such as an axle assembly which can be rearward. Other applications include farm or industrial power take-off shafts. Steel tubes have been used over the years and have generally proved reliable and effective. However, aluminum drive shafts offer advantages in weight and inertia savings if certain disadvantages in cost can be overcome. Some factors influencing the design of such a drive shaft include critical rotation speed, which is a function of the natural resonance of the shaft. If the critical speed of the drive shaft is within the rotary speed ranges encountered in normal use of the vehicle, especially under steady state (e.g. cruising) conditions, such can result in noise vibration harshness (NVH) conditions. If the encounter with critical speed is transitory or brief, it may be tolerable whereas if it occurs at cruising speed, it is less tolerable. Increasing the drive shaft stiffness increases the resonance frequency and critical speed to such a high level that it is not encountered in normal cruising speeds which alleviates the NVH problem. An increase in diameter of the tube can stiffen the tube adequately but, in turn, can add weight unless the wall thickness of the tubing is made correspondingly thinner but this, in turn, can require a higher strength material or a more costly composite.

One aluminum alloy that has been used for drive shaft applications is alloy 6061 which, according to the Aluminum Association (AA) registered limits, contains 0.8 to 1.2% magnesium, 0.4 to 0.8% silicon, 0.15 to 0.4% copper, 0.04 to 0.35% chromium, the balance being aluminum and incidental elements and impurities. Some drive shafts made of 6061 are speed restrictable and their use can involve a governor to reduce the drive shaft speed and avoid the drive shaft's critical speed. The use of longitudinal graphite fibers pultruded on the outside of a 6061 alloy drive shaft tube provides a composite drive shaft that is stiffer, such that it can spin or rotate faster, but this obviously adds to the cost of the drive shaft.

Another important aspect of a drive shaft is that it effectively transmits quite substantial amounts of torque. For instance, in a lightweight truck or a large automobile, the engine torque might be 350 pound feet at the engine crank shaft, but that can be elevated to a much higher level through a multiplying transmission (in a low gear) to a torque level of 1000 or even somewhat higher, for instance 1400 or 1500 pound feet of torque at the transmission output. Transmitting this torque obviously places a strength demand on the drive shaft in addition to the critical speed-vibration limitations.

Typical drive shafts can range from about 2 or 3 inches in outside diameter (O.D.) to about 4½ or 4¾ inches or even higher especially for trucks, for instance up to about 5 inches O.D. or even more, such as up to 5½ inches or 6 inches or 7 inches or 7½ inches or more. Typical wall thicknesses are within about 0.05 or 0.06 inch up to about 0.08 or 0.09 or 0.1 inch or even thicker, for instance up to about 0.13 or 0.14 inch or 0.16 or 0.17 inch or more, for instance 0.25 inch. For instance, a typical drive shaft for an automobile could have an outside diameter of about 3.5 inches and a wall thickness of about 0.08 inch, whereas a drive shaft for a truck could have an outside diameter of about 4½ inches or 5 inches and a wall thickness of around 0.07 to 0.09 inch and a typical medium duty truck drive shaft can have an O.D. of 7 inches and a wall thickness of about ¼ inch.

In addition to the performance demands on the drive shaft, the material selected for a drive shaft needs to be readily capable of the fabrication steps employed in making a drive shaft which can include welding yokes at each end for universal joints which, in turn, requires that the material selected be weldable and that it have good strength capability after welding.

SUMMARY OF THE INVENTION

In accordance with a preferred embodiment of the invention, an aluminum alloy containing about 0.5 to 1.3% magnesium, about 0.4 to 1.2% silicon, about 0.6 to 1.2% copper, about 0.1 to 1% manganese, the balance substantially aluminum and incidental elements and impurities, is employed to make improved vehicle power transmission drive shafts at reduced cost over some other approaches, especially when considering the drive shaft designs that require high operating capability in terms of relatively high rotation speeds and relatively high torque transmission. The use of the tubing made in accordance with the invention enables producing vehicular drive shafts having the desired characteristics.

The aforesaid preferred alloy for the invention drive shafts includes AA alloy 6013 which is described in U.S. Pat. No. 4,589,932, the entire content of which is fully incorporated herein by reference. The Aluminum Association composition limits for alloy 6013 are 0.6 to 1% silicon, 0.8 to 1.2% magnesium, 0.6 to 1.1% copper, 0.2 to 0.8% manganese, 0.5% maximum iron, 0.1% maximum chromium, 0.25% maximum zinc, 0.1% maximum titanium, other elements 0.05% each, 0.15% total, the balance substantially aluminum. The entire content of the Aluminum Association "Aluminum Standards and Data", 1993, is incorporated herein by reference. All composition limits herein are by weight.

In accordance with the invention, the improved drive shaft stock is preferably made by an improved process including extruding and drawing to better facilitate consistent good strength properties including ultimate (breaking) tensile strength and yield strength, along with quite good elongation and quite good workability. This is attributed, at least in part, to achieving in the drawn tube a relatively uniform or consistent recrystallized grain structure as described herein. If care is not exercised in producing the desired extruded and cold finished tube, large or relatively widely varying grain sizes can occur when the metal recrystallizes during heating such as during an anneal or a solution heat treatment. Such grains of large or relatively widely varying size can detract from strength properties by either lowering them or making them inconsistent from extrusion to extrusion or even along the length of a given extrusion, or combinations of these effects. It can be desired to have the tube unrecrystallized such that most, for instance 70% or more, or substantially all of the tube metal is unrecrystallized. However, in making cold drawn, or cold finished, tube, achieving a sufficiently unrecrystallized grain structure can be difficult in view of the substantial amounts of cold work used in producing the relatively thin-walled tubes. When subsequently annealed or solution heat treated, the cold worked tube can recrystallize but that can lead to small grains along with large grains. This mixed grain structure impairs consistent strength and corrosion resistance. If the extrusion stock (billets or castings used for extruding into extrusions) is relatively small, such as 6 to 8 or 9 inches diameter, or the resulting extrusion is quite thin, such as ⅛ or ¼ inch (or both), such can favor achieving finer relatively more uniform grain size than using larger commercial scale practices such as ingot or extrusion stock over 11 or 12 inches, such as 13-inch or 14-inch or 15-inch to 18 or 20 or 22-inch or larger diameter stock, and making extruded sections thicker than ¼ or ½ inch (for instance, above 1 inch thick) where, it has been found, the extrusion operation can lead to excessively large recrystallized grains later in the overall manufacturing process. Nonetheless, the invention is useful with billet sizes from 6 inches (or less) up to and over 14 or 15 inches diameter.

In accordance with the invention, it has been found that controlling the extrusion temperature as hereinbelow set forth can overcome the problem of excessive grain size or variation after solution heat treating or other elevated temperature exposures such as annealing. That is, extrusion temperatures of 850° or 1000° F., especially temperatures over about 900° F., (as referred to in U.S. Pat. No. 4,589,932) can be detrimental in making certain cold finished tube, whereas extruding at temperatures of 400° to 600° F. or 700° F. can be quite beneficial in producing certain products of more uniform or relatively fine recrystallized grain size, or both.

In accordance with the invention, the improved tubing is preferably made by extruding under controlled conditions which is followed by drawing the extruded tube at substantially room temperature to cold work it and reduce its metal cross-sectional area which, in turn, is followed by solution heat treating, quenching and stretching in a typical sequence. The cold reductions by drawing can be in the area of 20 to 25% reduction per pass for overall reductions of about 20 or 30% up to about 60 or even 80% in typical productions.

The invention also includes making a 6000 Series aluminum alloy drive shaft from a drawn tube whose ends are reduced in diameter by push pointing or rotary swaging, preferably a relatively short time after solution treating and quenching.

DETAILED DESCRIPTION

In accordance with a preferred process, the alloy composition is formulated to contain about 0.5 to 1.3% magnesium, preferably about 0.7 or 0.8 to 1.1 or 1.2% magnesium, and about 0.4 to 1.2%, preferably about 0.6 to 0.9 or 1% silicon and about 0.6 to 1.2%, preferably about 0.7 to 1%, copper and about 0.1 to 1%, preferably about 0.2 or 0.3 to 0.7 or 0.8%, manganese with iron preferably around 0.5% or less, for instance 0.35 or 0.4% or less, the balance substantially aluminum and incidental elements and impurities. Unless indicated otherwise, all composition percentages set forth herein are by weight. The alloy is typically solidified into ingot derived working stock by continuous casting or semi-continuous casting into a shape suitable for extrusion which is typically a round ingot billet. The ingot can be machined or scalped to remove surface imperfections, if desired, or it can be extruded without machining if the surface is suitable for such. The extrusion process produces a substantially reduced diameter but greatly increased length compared to the extrusion billet. Before extrusion, the metal is typically preheated or homogenized preferably by heating to a temperature above 950° F., for instance within 1000 to 1050° or 1060° F. or more, preferably within about 1030° or 1040° to about 1050° or 1060° or 1070° F. or possibly 1080° F. or higher (although melting related damage which can occur at 1075° F. should be avoided), for over one hour, more preferably about 4 hours or more, for instance 6 or 8 hours or more, such as 24 hours or more, preferably in a protective atmosphere.

After preheat or homogenizing, the stock is extruded to produce a hollow tube, it generally being recognized in the extrusion art that dies and other provisions can be made for extruding hollow shapes. The die-over-mandrel technique using a pre-drilled hollow extrusion stock or billet and the piercing process which pierces a solid extrusion stock or billet in the extrusion press are two known techniques suitable for making seamless hollow extrusions. Extrusion can be direct or indirect extrusion. It is an important preference in practicing the invention that extrusion be conducted at temperatures at or above 400° F., typically within about 500° or 600° up to about 700° F., preferably within about 500° or 550° or 600° to about 650° or possibly 675° F., for instance within temperatures of about 600° or 620° to about 650° F. Temperatures up to 750° or possibly 800° F. or even higher, such as temperatures of 850° or 875° or even possibly up to 890°, can be useful in this embodiment but on a less preferred basis. Extrusion rates of at least 75 feet per minute are preferred especially if the extrusion temperature is relatively high, for instance 750° F. or more, especially temperatures of 800° F. or more. The extrusion ratio (billet cross section metal area divided by extrusion cross section metal area) is desirably at least 5 to 1, typically about 5 to about 30 or more to 1, for instance about 8 or 10 to 25 or 27:1. Extrusion temperatures can be controlled by heating the extrusion stock and preferably also the extrusion chamber to the desired temperature. In accordance with the invention, it has been found that using extrusion temperatures and extrusion ratio as just described can overcome a tendency to encounter excessively varying or large grain size when the material recrystallizes during subsequent heating such as solution heat treating. Extrusions made by indirect extrusion often can have larger grains in the immediate outer surface or "skin" region. In referring to grain size herein, such is intended to refer to the regions inside the skin regions in extrusions or products made from such. Typical examples of extruded stock suited for making drive shafts herein can include outside diameters (O.D.) from about 3 or 4 to 6 or 7 or 8 inches or possibly more and wall thicknesses from about 0.06 or 0.07 inch, typically 0.08 or 0.09 inch to around 0.12 or 0.14 inch or higher, up to 0.2 inch or more, even up to about 0.4 inch or possibly more, for instance ½ inch for large diameter extruded stock.

The extrusion typically has ends cropped off and can be cut to desired lengths for subsequent operations. The extrusion may be annealed for around 1 or 2 hours at a temperature within about 600° to about 700°, for instance about 650° F., furnace cooled to about 450° upon which the tube can be removed from the furnace. Annealing at this point can be preferred but is not necessary. The annealing conditions the metal for subsequent drawing operations and can be advantageous especially where the drawing operations produce substantial reductions in thickness.

The tubing is next subjected to cold drawing wherein it is pulled through a die which reduces the outside diameter and the wall thickness. Normally there is a mandrel inside the tube during this drawing operation. This drawing significantly reduces the outside diameter and wall thickness and makes the tube significantly longer while slightly reducing the tube I.D. Each drawing operation or stage typically involves a single die and a reduction in metal cross-sectional area of about 2 or 5 or 10 or 12 or 15 to 30% or 40% or 50% or more, preferably about 15 or 18 or 20% to about 22 or 23 or 25% or even higher reductions up to 30 or 40%. Two or three such reductions or stages can be taken, one after the other, to accumulate a substantial reduction, for instance 25% to 80% or more, but if total overall reductions exceeding 50% are desired, it can sometimes be advantageous to impose an intermediate anneal somewhere in the drawing schedule. For instance, two or three or possibly four drawing reductions can be made followed by an intermediate anneal followed, in turn, by two or three or four more drawing reduction passes. However, reductions in the neighborhood of 75% can be done without annealing.

In some cases, it may be desired to make a tube with wall thickness that is thicker at the ends. This can enhance welding universal joint yokes at the ends of the tube or other types of fastening at the ends or possibly elsewhere where local thicker metal, for instance at the end of a shaft, facilitates better fastening. In the case of welding, the strength in the heat affected zone can be lowered and this effect compensated for by the local thicker tube wall thickness. U.S. Pat. No. 4,527,978 shows an example of an automotive drive shaft that has thicker end walls. This variation in wall thickness can be accompanied by either an increase in outside diameter or a decrease in inside diameter, or possibly both, and can be accomplished by machining, but it is preferred to accomplish it during drawing by positioning a step in a mandrel or the butt end of a mandrel closer to a tapered drawing die inlet (thinner tube wall) or slightly further away for a thicker drawn tube wall thickness, in which case the outside diameter remains essentially the same but the inside diameter is lessened at the tube end region to increase tube wall thickness. The drawing of stepped or varying thickness tube walls is known in the art and, if done, preferably should be done before solution heat treating. One preferred way is shown in U.S. Pat. No. 4,788,841 to Calhoun and Davis, the entire disclosure and content of which is hereby incorporated by reference. In the case of a variable wall thickness, the drawing thickness reduction percentages just discussed typically refer to the thinner part of the drawn tube, although in some cases they can refer to the thicker wall. Other disclosures illustrating techniques for producing variable thickness wall tubing are U.S. Pat. Nos. 2,228,301, 2,258,242 and 2,679,925. All of the aforesaid U.S. Pat. Nos. 2,228,301, 2,258,242, 2,679, 925, 4,527,978 and 4,788,841, are fully incorporated herein by reference.

Heating the tube, either during an intermediate anneal, if one is used, or during solution heat treatment typically can cause recrystallization to occur and the practice of the invention favors forming a relatively fine and relatively uniform recrystallized grain size when this recrystallization occurs. Typical transverse recrystallized grain sizes preferably can range from ASTM-2 or -3 to ASTM-7 or -8 (higher numbers are finer grains) referring to ASTM E112, the entire content of which is hereby incorporated by reference. Tube of the herein referred to alloy made identically to the invention process except for extrusion temperatures around 850° or 900° F. can have quite large transverse grain sizes such as ASTM-0 and can have relatively widely varying grain sizes.

The tube is solution heat treated, preferably in a protective atmosphere, by heating to temperatures typically at 1000° F. or higher, preferably at temperatures of 1025° or 1030° F. or higher, for instance temperatures of 1035° or 1040° or 1045° F. or 1050° F. or higher, up to temperatures of about 1065° or 1070°, or possibly 1080° F. or more, but not so high as to excessively damage the tube such as by approaching too close to melting or incipient melting which can occur as low as 1075° F. On a less preferred basis, solution heat treating can be at temperatures as low as 980° F. minimum or possibly 975°. However, as just stated, higher temperatures are preferred.

The solution heated tubing is then quenched, preferably by immersion in cold water, although cold water sprays or, in some cases, possibly even a drastic air quench could be used, it being preferable in some cases to assure a rapid quench. In some cases it can be advantageous to slightly retard quench to reduce residual stress, as discussed hereinbelow. The quenched tube can then be stretched about ½ to 1½% to straighten it or, if desired, it can be further drawn by pulling through a die as described earlier. Solution heat treating and quenching, with or without a relatively small amount of cold work in straightening (that may not be recognized in setting mechanical property limits), produces a T4 type temper condition.

The T4-type condition can be cut or segmented to suitable lengths and the wall thickness at the end regions made thicker as described earlier. This temper is quite workable which eases the process although not as workable as the W temper as discussed below. Alternatively, the end region wall thickness can be increased before solution heat treatment.

The solution heat treated tube, with or without subsequent stretching or cold drawing, or wall thickening at the end regions, is artificially aged to develop its strength properties. This typically includes heating above 250° or 270° F., typically above 300° F., for instance within about 330° or 340° or 350° to about 400° or 420° F. or 430° F. or a little more, preferably within about 360° to about 390° or possibly 400° F. for a period of time within around an hour or a little less or two hours to about 10 or 15 hours, typically about 3 or 4 to 5 or 6 hours for temperatures about 350° to 390° F., which generally varies inversely with temperature (higher temperature for less time or lower temperature for longer time) and this develops artificially aged or T6 or T8 strength, depending on whether or not and to what extent cold work is utilized after solution heat treating and before artificial aging. If the amount of cold work performed on the solution heat treated and quenched tube is around 1% or so, for instance, if the tube is only straightened and then artificially aged, the tube can be in a T6 type condition, whereas if a higher amount of cold work is used between solution heat treating and aging, for instance, drawing reductions around 4 or 5% or so to about 30% or so, the resulting tubing can be in a T8 type temper such as T81. These drawing operations (after solution heat treating) offer certain advantages in facilitating very good dimensional control. In addition, there can be a significant increase in strength such as an increase of 5% or 10% and possibly more.

Referring to the invention products, the invention tubing in T6 temper can have a relatively high strength roughly in the same ballpark as aerospace alloy 2024 in T3 temper (2024-T3 tube can have a yield strength around 42 ksi and a tensile strength over 60 ksi) but not have 2024's inferior stress corrosion cracking resistance, the invention product being quite resistant to stress corrosion cracking effects which can be a serious consideration in vehicle drive shafts since an unexpected stress corrosion crack breakage during hard use would be undesirable product performance. The invention tubing also has good fracture toughness and good fatigue properties in a drive shaft assembly.

In manufacturing improved vehicular power transmission drive shafts in accordance with the invention, the invention tubes are welded or otherwise joined to end caps or end members which typically are employed to connect to or form a part of universal joints (U-joint) or possibly to other attachments or fixtures at one or both ends of a drive shaft. Often the drive shaft is welded to a U-joint yoke. The welding can be by tungsten inert gas (TIG), metal inert gas (MIG) welding or any other kind of welding suitable for the purpose, an important benefit achieved in the practice of the invention being that good welds are relatively easy to achieve and the strength of the welded assembly is quite good in comparison with other materials employed in making drive shafts. As explained earlier, the tubes can have their end regions made thicker, for instance, for adapting to welding or other connection means. Welding alloys containing over 3% silicon, for instance welding alloy containing about 3.5 to 6% Si with or without about 0.05 or 0.1 to 0.3 or 0.4% Mg, can be used as the weld filler alloy. Alloy 4043 contains about 4.5 to 6% Si (max Mg is 0.05%) and alloy 4643 contains about 3.6 to 4.6% Si and about 0.1 to 0.3% Mg and both are examples of known filler alloys suitable for welding the invention drive shafts. It can be preferred to use weld filler alloy containing over 0.05% Mg, more preferably 0.1% Mg or more, to reduce any tendency for the weld filler metal to draw Mg from the aluminum tube members.

Another aspect of the invention includes production of a drive shaft tube having a relatively larger diameter for the central region and dominant region of its length and a smaller diameter tube portion at one or both ends. This provides the benefit of a larger major (central) length diameter for increased critical speed and smaller end diameter for fitting and connecting to other members. The smaller diameter end reduction is imparted by swaging, for instance rotary swaging, or preferably by push-pointing, which tapers down the outside diameter to a smaller diameter at one or both ends. Push pointing is preferred because it induces less residual stress in the reduced diameter region than swaging which, in more severe reductions, can cause cracks. Push pointing, because of less harsh metal working for a given reduction, is thus preferred from the standpoint of less residual stress and less tendency to crack or induce cracks. In addition, push pointing results in much better reduced I.D. inside surface particularly where an inside mandrel is not used. The swaged or push-pointed smaller diameter (end) portion typically has a thicker wall than the larger diameter (central) portion and the taper transition between the larger and smaller diameters gradually thickens in wall thickness going from the larger, thinner wall diameter to the smaller, thicker wall diameter. Rotary swaging is a known technique wherein opposing dies are rapidly hammered against the outer diameter of a tube to swage down the diameter to a smaller diameter. Push pointing is a known technique wherein a tube or pipe of given diameter is pushed through a tapered reducing die to neck down or reduce the initial tube diameter.

In practicing the invention with either swaging or push pointing, it can be preferred that the operation be carried out over a mandrel such that the reduced internal diameter is formed against a mandrel which can enhance surface of the reduced internal diameter and thus improve frictional fit with the mating surface of the yoke or other end member and possibly can leave some of the metal in compressive reduced residual stress which can be an advantage. The mandrel is preferably fixed laterally relative to the push point dies and tube gripper means rather than being free to float or move laterally so as to more precisely control dimensions and concentricity and metal working and movement. The mandrel can have a raised ring or band on its front end region (the end projecting into the tube) such that when the mandrel is withdrawn said raised ring bearing surface works the inside surface of the reduced diameter tube end which can provide quite good reduced end I.D. dimensional control and good surface which is important for friction fitting with the drive shaft U-joint yoke. This effect can be combined with moving the O.D. bearing surface of the push point die or dies along the reduced O.D. such that something of an ironing effect occurs as the inside mandrel and O.D. dies are moved together along the reduced O.D. in withdrawing the tube from the push point tooling.

A typical illustrative example of a tube that is end reduced by swaging or push pointing could start with a tube about six feet long having an outside diameter of about 5 inches and a wall thickness of about 0.08 inch. The last four to six inches on each end are reduced down to an outside diameter of about four inches with a wall thickness which may be around 0.09 or 0.095 inch. A taper of about 10 to 12° and about 1½ to 2 inches long serves as a transition between the four-inch outside diameter end region and the five inch O.D. central region which is roughly in the neighborhood of five or so feet in length. Thus, the tube after swaging or push pointing has a central region roughly ranging from about four and a half feet to about five or so feet long that is about five inches in outside diameter and, at each end, a two or so inch transition or taper down to a four-inch diameter followed by a four- to six-inch length that is four inches in diameter. The wall thickness in the transition region varies from the thinner central region (about 0.08 inch thick) to the thicker end region (about 0.09 or 0.095 inch thick). If a mandrel is used, the wall thickness at the reduced end can be further controlled so as to be the same as the unreduced central region of the tube length or even thinner. In the illustrative example of the six-foot long, five-inch O.D. tube, using a mandrel, the end region wall thickness can be any desired thickness less than the 0.09 or 0.095 inch thickness achieved without the mandrel. The thickness at the reduced shaft end thus could be 0.085 or even 0.075 inch or any practical thickness less than the 0.09 or 0.095 inch wall achieved without a mandrel.

Another aspect affecting wall thickness at an end region of the drive shaft is to thicken a tube end as described earlier, for instance as described in U.S. Pat. No. 4,527,798 and then push point the tube to reduce the diameter of that same tube end region. These operations can combine to make the reduced diameter tube end wall fairly thick compared to the starting tube wall thickness.

The swaging or push-pointing tube end reduction is preferably done after solution heat treatment and quenching such that the drive shaft can be artificially aged after swaging. After solution heat treating, the tube is drastically quenched in cold water or it can be subjected to a controlled quench to reduce distortion of the tube such as by using means to slightly retard the rate of cooling, such as by quenching in warm water, for instance water at a temperature within around 120° or 130° or possibly 140° to 160° or 170° or possibly 180° F., or by using chemical quench rate additives such as polyalkylene glycol in an amount of 10 or 15% to about 30 or 40% in water at roughly room or slightly elevated temperature, such as 90° to 110° F. Another quench approach is to use water containing carbon dioxide, for example carbonated water. These procedures can lower residual stresses and thus reduce the amount of distortion to be corrected later. The strength loss, if any, that may result from the use of a retarded quench can be reduced or minimized by carefully controlling the quench conditions so as to quench at a slightly reduced rate but not a grossly reduced quench rate.

After quenching either rapidly or in a controlled, slightly retarded quench, the tubing is stretched if desired or roll straightened as needed, or both, to adequately straighten it and control roundness, and it is then cut to length, that is, provided as a length substantially suitable for making into a drive shaft, herein sometimes referred to as a drive shaft suitable length. At this point, the swaging, or push pointing operation is applied to one or both end regions of the tube so as to make the desired configuration of a larger diameter, thinner walled tube in the central region of the drive shaft tube with one or both ends featuring a smaller outside diameter, thicker walled region with a transition region between the larger and smaller diameters wherein the wall thickness tapers from the thicker, smaller diameter condition to the larger diameter, thinner wall condition. The swaging or push pointing is carried out at room temperature and the workability of the material after solution heat treating and quenching is such as to permit the operation. It is preferable to perform the end diameter reduction (preferably by swaging or push pointing) shortly after quenching when the metal has a lower yield strength rather than days later in a naturally aged stable T4 higher strength condition because the fatigue strength (for a given number of cycles) and performance (for instance, the number of cycles at particular cyclic loading) of the product after artificial aging can suffer if too much time or natural room temperature aging is allowed to occur before end reduction even though end reduction precedes artificial aging. Accordingly, it is preferred to perform the tube end reduction within not more than 24 to 30 hours after solution heat treatment and quenching, preferably within 10 to 15 or 20 hours at room temperature, more preferably within not more than 3 or 4 or 5 hours, although on a less preferred basis a time of around up to 40 or 48 hours, or in some cases 60 hours or more on a much less preferred basis, may be used. Refrigeration can retard natural aging and prolong the time between solution heat treating and tube end reduction. Accordingly, yield strength can be used as an indicator as to how far natural aging has proceeded. For instance, for alloy 6013 discussed hereinabove the yield strength 15 minutes after quench can typically be around 11 or 12 ksi but increases to around 19 or 20 ksi or so after about 10 hours and about 22 ksi or so after about 24 hours. For alloy 6061, the yield strength 15 minutes after quench can typically be around 9 ksi or so and increase to around 13 or 14 ksi or so about 10 hours after quench and around 15 or 16 ksi or so after about 24 hours. Refrigeration after quench can very substantially lengthen the time it takes to reach a given degree of natural aging or associated strength level. For instance, cooling below 0° F. can greatly extend these times. Hence, when speaking herein of performing tube end reduction substantially within a time such as 10 hours or its substantial equivalent, such is intended to refer to within around 10 hours at about room temperature (around 70°–90° F.) or within a longer time at reduced or refrigerated temperature so long as the degree of natural aging or associated strength level does not exceed a level commensurate with room temperature aging up to 10 hours.

The temper designation sometimes used for solution heat treated and quenched material is W temper, referring to the unstable condition between quenching and natural aging to a substantially stable strength level (T4 temper). A designation "W ½ hour" refers to ½ hour after quench and the strength level associated with ½ hour natural aging after quench, and, further, as used herein, refers to that same strength level, albeit at a longer time after quench than ½ hour in the case of refrigeration or reduced temperature which retards the natural aging strength effect for a given time period.

After push pointing or swaging, the drive shaft can be chamfered, if desired, and then artificially aged as discussed earlier. The aforesaid swaged or push pointing end region drive shaft is preferably carried out on the preferred alloy as described earlier, but also can be carried out on other alloys, such as other 6000 Series type alloys, (that is, aluminum alloys containing Mg and Si as the major alloy additions typically along with one or more of Cu, Mn or Cr, typically in lesser amounts than Mg and Si), for instance alloy 6061, containing 0.4 to 0.8% Si, 0.8 to 1.2% Mg, 0.15 to 0.4% Cu, 0.04 to 0.35% Cr. The 6000 Series alloy can be provided with or without continuous or discontinuous reinforcing media such as aluminum oxide particles (discontinuous), preferably about 9 or 10 to 12 or 13 microns in size or diameter present in about 15 to 25, percent volume fraction, typically around 20%. In the case of such a 6000 type alloy metal matrix composite, the cold drawing reductions can be usually less, for instance around 2 or 5% or more, than is preferred for a monolithic alloy such as unreinforced 6061 alloy. However, the use of the alloy described earlier is preferred for some applications. The drive shaft end members can be welded or attached after artificial aging.

Up to this point, the process of making an improved drive shaft has been described in terms of preferred practices wherein a tube is extruded, preferably under controlled temperature conditions and preferably then annealed and then drawn to substantial reductions through drawing dies, and then solution heat treated and quenched. However, in a broader sense the invention includes, albeit on a less preferred basis, using a press quench rather than separate solution heat treating later. According to this less preferred sequence, the material is heated to a solution heat treating temperature and then is hot extruded into a tube which is quenched as it exits the extrusion operation and is then preferably cold drawn to some reduction of, for instance, 2 or 5% or more, preferably 8 or 10% or more, and is then cut to length and subjected to push pointing or swaging to provide a drive shaft tube with one or both end regions of the tube imparted with a smaller diameter than the central regions of the tube but with the end region or regions with the smaller outside diameter typically having a thicker walled tube. The extrusion temperature can be higher than needed for extrusion itself, but high extrusion temperatures can favor solutionizing effect. While some cold drawing at some time after extrusion is preferred, such can be omitted, albeit on a less preferred basis, provided suitable dimensional control can be achieved in extruding. Indirect extrusion may be helpful in achieving dimensional control. As indicated, this sequence is less preferred than the sequence earlier described because of potentially lowering fatigue strength especially in the region of the welds used to join the drive shaft tube to the end members, for instance universal joint (U-joint) yokes. Nonetheless, this sequence can be useful especially if the operations are carried out rapidly such that the substantial metal working aspects of drawing and push pointing or swaging are carried out within 40 or 48 hours after the press quenching, preferably within 24 or 30 hours, and more preferably within 10 or 15 or 20 hours after quenching, and further, preferably if the push pointing operation uses a mandrel on the inside of the tube sized for the push point reduced I.D. at the tube end region. That is, the drawing operation and the diameter reduction and diameter reduction at the end region or regions are preferably all concluded within the time span after press quenching just indicated. Another practice, albeit less preferred, is to push point reduce the drive shaft end region or regions after artificial aging, especially if artificial aging is carried to a strength level less than that sometimes referred to as peak strength (T6), for instance, if the metal is overaged (artificially aged past "peak strength" which lowers the strength below "peak strength"), although for less severe push point reductions, such as reductions less than 15 or possibly 20% of the O.D. (for instance, a 10% or less O.D. reduction), it can be feasible to push point reduce T6 tube. However, where the reduction in O.D. is over 15 or 20%, push pointing after artificial aging can have disadvantages and, while possible, is not preferred.

The improved drive shafts, especially following the herein preferred practices, will have good strength and good corrosion resistance even in the heat affected zone adjacent weldments. The use of the invention tubing in making the drive shaft can avoid or reduce the need to resort to graphite fibers on the outside to attain the necessary performance without the complexities and cost of adding the fibers to make a composite.

Unless indicated otherwise, the following definitions apply herein:
a. The term "ksi" is equivalent to kilopounds (1000 pounds) per square inch.
b. Percentages for a composition refer to % by weight.
c. The term "ingot-derived" means solidified from liquid metal by a known or subsequently developed casting process rather than through powder metallurgy techniques. This term shall include, but not be limited to, direct chill casting, electromagnetic casting, spray casting and any variations thereof.
d. In stating a numerical range or a minimum or a maximum for an element of a composition or a temperature, time or other process matter or a property or an extent of improvement or any other matter herein, and apart from and in addition to the customary rules for rounding off numbers, such is intended to specifically designate and disclose each number, including each fraction and/or decimal, (i) within and between the stated minimum and maximum for a range, or (ii) at and above a stated minimum, or (iii) at and below a stated maximum. (For example, a range of 1 to 10 discloses 1.1, 1.2 . . . 1.9, 2, 2.1, 2.2 . . . and so on, up to 10, and a range of 500 to 1000 discloses 501, 502 . . . and so on, up to 1000, including every number and fraction or decimal therewithin, and "up to 5" discloses 0.01 . . . 0.1 . . . 1 and so on up to 5.)

Having described the presently preferred embodiments, it is to be understood that the invention may be otherwise embodied within the scope of the appended claims.

What is claimed is:

1. In a method of producing a drive shaft wherein an aluminum tube member is joined to drive shaft end members, the improvement wherein said aluminum tubular member is made by a method comprising:

(a) providing an alloy consisting essentially of about 0.7 to 1.2% magnesium, about 0.4 to 1.2% silicon, about 0.6 to 1.2% copper, about 0.1 to 1% manganese, balance substantially aluminum and incidental elements and impurities;

(b) extruding said alloy within about 500° to 800° F. into a hollow elongate tube of drive shaft suitable diameter;

(c) cold drawing said alloy and reducing its metal cross-sectional area; and (d) solution heat treating said alloy at more than about 950° F. and then quenching.

2. The method according to claim 1 wherein said aluminum tubular member has a wall thickness at at least one end region that is thicker than the wall thickness at some other regions.

3. The method according to claim 1 wherein said quenching is substantially by extrusion press quenching.

4. The method according to claim 1 wherein said extruding in (b) is within about 600° to 745° F.

5. In a method of producing a drive shaft wherein an aluminum tube member of drive-shaft suitable length is joined to drive shaft end members, the improvement wherein said aluminum tubular member is made by a method comprising:

(a) providing an alloy consisting essentially of about 0.7 to 1.2% magnesium, about 0.4 to 1.2% silicon, about 0.6 to 1.2% copper, about 0.1 to 1% manganese, balance substantially aluminum and incidental elements and impurities;

(b) extruding said alloy within about 500° to 800° F. into a hollow elongate tube;

(c) drawing said alloy to a reduction of at least 10% in metal cross-sectional area;

(d) solution heat treating said alloy at at least about 990° F. and then quenching;

(e) further cold working said tubing; and (f) artificial aging.

6. The method according to claim 5 wherein said extruding in (b) is within about 600° to 745° F.

7. In a method of producing a vehicular drive shaft wherein an aluminum tube member is joined to drive shaft end members, the improvement wherein said aluminum tubular member is made by a method comprising:

(a) providing an alloy consisting essentially of about 0.7 to 1.2% magnesium, about 0.4 to 1.2% silicon, about 0.6 to 1.2% copper, about 0.1 to 1% manganese, balance substantially aluminum and incidental elements and impurities;

(b) extruding said alloy within about 500° to 800° F. into a hollow elongate tube;

(c) drawing said alloy to a reduction of at least 15% in metal cross-sectional area;

(d) solution heat treating said alloy at at least about 990° F. and then quenching;

(e) reducing the outer diameter of the tube and increasing the tube wall thickness to provide a relatively short tube length of reduced diameter and thicker wall thickness at one or both ends of a drive shaft suitable length of said tube, said reducing being performed within a time after said quenching equivalent to not more than 30 hours at room temperature; and (f) artificially aging said tube.

8. The method according to claim 7 wherein said reducing the diameter at one or both ends is done by operations comprising push pointing.

9. The method according to claim 7 wherein said reducing the diameter at one or both ends is done by operations comprising swaging or push pointing.

10. The method according to claim 7 wherein said extruding in (b) is within about 600° to 745° F.

11. The method according to claim 7 wherein said time after said quenching in (e) is equivalent to not more than 24 hours at room temperature.

12. The method according to claim 7 wherein said time after said quenching in (e) is equivalent to not more than 20 hours at room temperature.

13. A method of producing a drive shaft comprising:
   (a) providing an alloy consisting essentially of about 0.7 to 1.2% magnesium, about 0.4 to 1.2% silicon, about 0.6 to 1.2% copper, about 0.1 to 1% manganese, balance substantially aluminum and incidental elements and impurities;
   (b) extruding said alloy within about 500° to 800° F. into hollow elongate tubing;
   (c) drawing said tubing to a reduction of at least 15% in metal cross-sectional area;
   (d) solution heat treating said tubing at at least about 990° F. and then quenching;
   (e) reducing the outer diameter of the tube and increasing the tube wall thickness to provide a relatively short tube length of reduced diameter and thicker wall thickness at one or both ends of a drive shaft suitable length of said tube, said reducing being performed within a time after said quenching equivalent to not more than 30 hours at room temperature;
   (f) artificially aging said tube; and
   (g) welding said tube to an end member at one or both ends thereof including using a weld filler alloy containing over 3% silicon.

14. The method according to claim 13 wherein said reducing the diameter at one or both ends is done by operations comprising push pointing.

15. The method according to claim 13 wherein said reducing the diameter at one or both ends is done by operations comprising swaging or push pointing.

16. The method according to claim 13 wherein said extruding in (b) is within about 600° to 745° F.

17. The method according to claim 13 wherein said time after said quenching in (e) is equivalent to not more than 24 hours at room temperature.

18. The method according to claim 13 wherein said time after said quenching in (e) is equivalent to not more than 20 hours at room temperature.

19. A method of producing a power drive shaft comprising:
   (a) providing an aluminum alloy containing magnesium and silicon as principal alloying ingredients, said alloy further containing a discontinuous reinforcing media;
   (b) extruding said alloy into a hollow elongate tube;
   (c) solution heating and quenching;
   (d) reducing the outer diameter of the tube by push pointing to provide a relatively short tube length of reduced diameter at one or both ends of a drive shaft suitable length of said tube, and
   (e) artificially aging said tube either before or after said push pointing.

20. The method according to claim 19 wherein said artificial aging is done after said push pointing.

21. The method according to claim 19 wherein drawing to a reduction of at least 10% is performed on the extruded tube to produce a drawn tube which is solution heat treated and quenched after said drawing.

22. The method according to claim 19 wherein said push pointing reducing in (d) uses an inside mandrel during said push pointing.

23. The method according to claim 19 either before or after solution heat treating the tube is drawn to a reduction of at least 2% in metal cross-sectional area.

24. A method of producing a power drive shaft comprising:
   (a) providing an aluminum alloy containing magnesium and silicon as principal alloying ingredients and a discontinuous reinforcing media;
   (b) extruding said alloy into a hollow elongate tube;
   (c) solution heating and quenching;
   (d) either before or after solution heat treating, drawing the tube to a reduction of at least 2% in metal cross-sectional area;
   (e) reducing the outer diameter of the tube by push pointing to provide a relatively short tube length of reduced diameter at one or both ends of a drive shaft suitable length of said tube, and
   (f) artificially aging said tube.

25. The method according to claim 24 wherein solution heating is at or before extrusion and quenching is done substantially by extrusion press quenching and drawing follows said quenching.

26. The method according to claim 24 wherein drawing to a reduction of at least 10% is performed on the extruded tube to produce a drawn tube which is solution heat treated and quenched after said drawing.

27. The method according to claim 24 wherein said push pointing reducing in (e) uses an inside mandrel during said push pointing.

28. A method of producing a power drive shaft comprising:
   (a) providing an aluminum alloy containing magnesium and silicon as principal alloying ingredients and a discontinuous reinforcing media;
   (b) extruding said alloy into a hollow elongate tube;
   (c) solution heating and quenching;
   (d) either before or after solution heat treating, drawing the tube to a reduction of at least 2% in metal cross-sectional area;
   (e) reducing the outer diameter of the tube to provide a relatively short tube length of reduced diameter at one or both ends of a drive shaft suitable length of said tube, said reducing being performed within a time after said quenching equivalent to not more than 48 hours at room temperature; and
   (f) artificially aging said tube.

29. The method according to claim 28 wherein solution heating is at or before extrusion and quenching is done substantially by extrusion press quenching and drawing follows said quenching.

30. The method according to claim 28 wherein drawing to a reduction of at least 10% is performed on the extruded tube to produce a drawn tube which is solution heat treated and quenched after said drawing.

31. The method according to claim 28 wherein said reducing in (e) reduces the outer diameter and is by push pointing said end region using an inside mandrel during said push pointing.

32. The method according to claim 19, 24 or 28 wherein said reducing reduces the outer diameter and is by push pointing said end region using an inside mandrel during said push pointing and increases the wall thickness in at least some of the reduced diameter tube length.

33. The method according to claim 19, 24 or 28 wherein said alloy contains 0.8 to 1.2% Mg, 0.4 to 0.8% Si, 0.15 to 0.4% Cu, and 0.04 to 0.35% Cr.

34. The method according to claim 19, 24 or 28 wherein said discontinuous reinforcing media comprises aluminum oxide.

35. The method according to claim 1, 7, 19, 24 or 28 wherein after solution heat treating and quenching, the tube has a transverse grain size of about ASTM 3 to 8.

* * * * *